(12) United States Patent
Schulz et al.

(10) Patent No.: US 11,182,449 B2
(45) Date of Patent: Nov. 23, 2021

(54) METHOD AND SYSTEM OF RE-ASSOCIATING LOCATION MAPPINGS FOR UNIFORM RESOURCE IDENTIFIER NAMED OBJECTS

(71) Applicant: MICROSOFT TECHNOLOGY LICENSING, LLC, Redmond, WA (US)

(72) Inventors: Michael Henry Schulz, Bothell, WA (US); Jing Liu, Bellevue, WA (US); Wayne Robert Ewington, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 16/564,789

(22) Filed: Sep. 9, 2019

(65) Prior Publication Data
US 2021/0073300 A1    Mar. 11, 2021

(51) Int. Cl.
*G06F 16/955*    (2019.01)
*G06F 16/23*    (2019.01)

(52) U.S. Cl.
CPC ........ *G06F 16/955* (2019.01); *G06F 16/2379* (2019.01)

(58) Field of Classification Search
CPC .................... G06F 16/955; G06F 16/2379
See application file for complete search history.

(56) References Cited

U.S. PATENT DOCUMENTS

| | | | |
|---|---|---|---|
| 6,976,090 B2 | 12/2005 | Ben-Shaul et al. | |
| 7,266,832 B2 | 9/2007 | Miller | |
| 8,819,538 B2 * | 8/2014 | Underwood | G06F 40/186 715/208 |
| 9,215,243 B2 * | 12/2015 | Bommireddipalli | H04L 63/1416 |
| 10,996,963 B2 * | 5/2021 | Walker | G06F 40/117 |
| 2002/0046281 A1 * | 4/2002 | Cope | G06F 11/3476 709/227 |
| 2005/0060315 A1 | 3/2005 | Sanin | |
| 2008/0065649 A1 | 3/2008 | Smiler | |
| 2010/0131455 A1 * | 5/2010 | Logan | G06F 16/9577 707/602 |

(Continued)

FOREIGN PATENT DOCUMENTS

EP    3273363 A1    1/2018

OTHER PUBLICATIONS

"International Search Report and Written Opinion Issued in PCT Application No. PCT/US20/038272", dated Aug. 24, 2020, 10 Pages.

(Continued)

*Primary Examiner* — Huawen A Peng
(74) *Attorney, Agent, or Firm* — NovoTechIP International PLLC

(57) ABSTRACT

A method of and system for re-associating location mappings of two uniform resource identifier named objects may include receiving a request over a network to switch a source site associated with a first URI with a target site associated with a second URI such that content of the target site can be accessed via the first URI, renaming the target site to associate the target site with the first URI, changing a lookup data associated with the first URI from the source site to the target site, and renaming the source site to associate the source site with a third URI.

20 Claims, 9 Drawing Sheets

(56) References Cited

U.S. PATENT DOCUMENTS

| | | | | |
|---|---|---|---|---|
| 2011/0225206 | A1* | 9/2011 | Sureshchandra | ............................ H04L 29/12066 707/802 |
| 2014/0173417 | A1* | 6/2014 | He | ........................ G06F 40/123 715/234 |
| 2014/0173566 | A1 | 6/2014 | Hsu et al. | |
| 2014/0282978 | A1* | 9/2014 | Lerner | .................. H04L 63/083 726/7 |
| 2017/0244796 | A1* | 8/2017 | Liu | ........................ G06F 3/0484 |
| 2018/0025066 | A1* | 1/2018 | Lui | .................. G06F 16/24552 707/610 |
| 2019/0188226 | A1* | 6/2019 | Cheng | ..................... A63F 13/60 |

OTHER PUBLICATIONS

"Change your workspace or org name and URL", Retrieved from: https://web.archive.org/web/20190423013013/https:/get.slack.help/hc/en-us/articles/201663443-Change-your-workspace-or-org-name-and-URL, Apr. 23, 2019, 4 Pages.

"Changing all URLs in your WordPress database", Retrieved from: https://help.dreamhost.com/hc/en-us/articles/360003304711-Changing-all-URLs-in-your-WordPress-database, Retrieved Date: Jul. 24, 2019, 7 Pages.

"How to Move One Web Host to Another in 2019 (No Downtime!)", Retrieved from: https://www.isitwp.com/switch-one-web-host-another-without-downtime-step-by-step/, Retrieved Date: Jul. 24, 2019, 11 Pages.

Miller, Janet Driscoll., "How to Rebrand Without Losing Your Hard-Earned Rankings", Retrieved from: https://searchengineland.com/rebranding-seo-important-considerations-184208, Feb. 21, 2014, 8 Pages.

Singla, Deepak, "How to Mass Change old URLs in Website Database after Migration", Retrieved from: https://blog.templatetoaster.com/update-old-urls-in-database/, Apr. 5, 2019, 11 Pages.

"Application as Filed in U.S. Appl. No. 16/457,567", filed Jun. 28, 2018, 40 Pages.

* cited by examiner

| URI | SITE NAME |
|---|---|
| URI1 | URI1 |
| URI2 | URI2 |
| URI3 | URI3 |

| SITE | SITE NAME |
|---|---|
| SITE 1 | URI1 |
| SITE 2 | URI2 |
| SITE 3 | URI3 |

METHOD AND SYSTEM OF RE-ASSOCIATING LOCATION MAPPINGS FOR UNIFORM RESOURCE IDENTIFIER NAMED OBJECTS

TECHNICAL FIELD

This disclosure relates generally to reassociation of location mappings, and more particularly, to a method and system of efficiently re-associating existing objects identified by uniform resource identifiers with different contents.

BACKGROUND

Over the years, many websites and applications decide to improve and modernize their look or content. This is often done via redesigning the website. To do so this, developers often redesign a site offline by creating a new website, while keeping the original site intact to ensure access is provided to the site while it is being updated. Once a redesign has been completed, the developer often switches the original uniform resource identifier (URI) to point to the new site by using a temporary URI. This often causes a downtime for the site which results in inconvenience to users. This is particularly true if the website being switched is a root site via which multiple other subsites are accessed.

Hence, there is a need for an improved method and system of re-associating existing uniform resource identifier named objects with different contents.

SUMMARY

To address these issues and more, in one general aspect, the instant application describes a data processing system having a processor and a memory in communication with the processor where the memory stores executable instructions that, when executed by the processor, cause the data processing system to perform multiple functions. The function may include receiving a request over a network to switch a source site associated with a first URI with a target site associated with a second URI such that content of the target site can be accessed via the first URI, renaming the target site to associate the target site with the first URI, changing a lookup data associated with the first URI from the source site to the target site, and renaming the source site to associate the source site with a third URI.

In yet another general aspect, the instant application describes a method for re-associating location mappings of two URI named objects. The method may include receiving a request over a network to switch a source site associated with a first URI with a target site associated with a second URI such that content of the target site can be accessed via the first URI, renaming the target site to associate the target site with the first URI, changing a lookup data associated with the first URI from the source site to the target site, and renaming the source site to associate the source site with a third URI.

In a further general aspect, the instant application describes a non-transitory computer readable medium on which are stored instructions that when executed cause a programmable device to receive a request over a network to switch a source site associated with a first URI with a target site associated with a second URI such that content of the target site can be accessed via the first URI, rename the target site to associate the target site with the first URI, change a lookup data associated with the first URI from the source site to the target site, and rename the source site to associate the source site with a third URI.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 2A-2B depict simplified example site map and content databases for directing a URI to a website and identifying a website within the content store.

DETAILED DESCRIPTION

Figure 1:
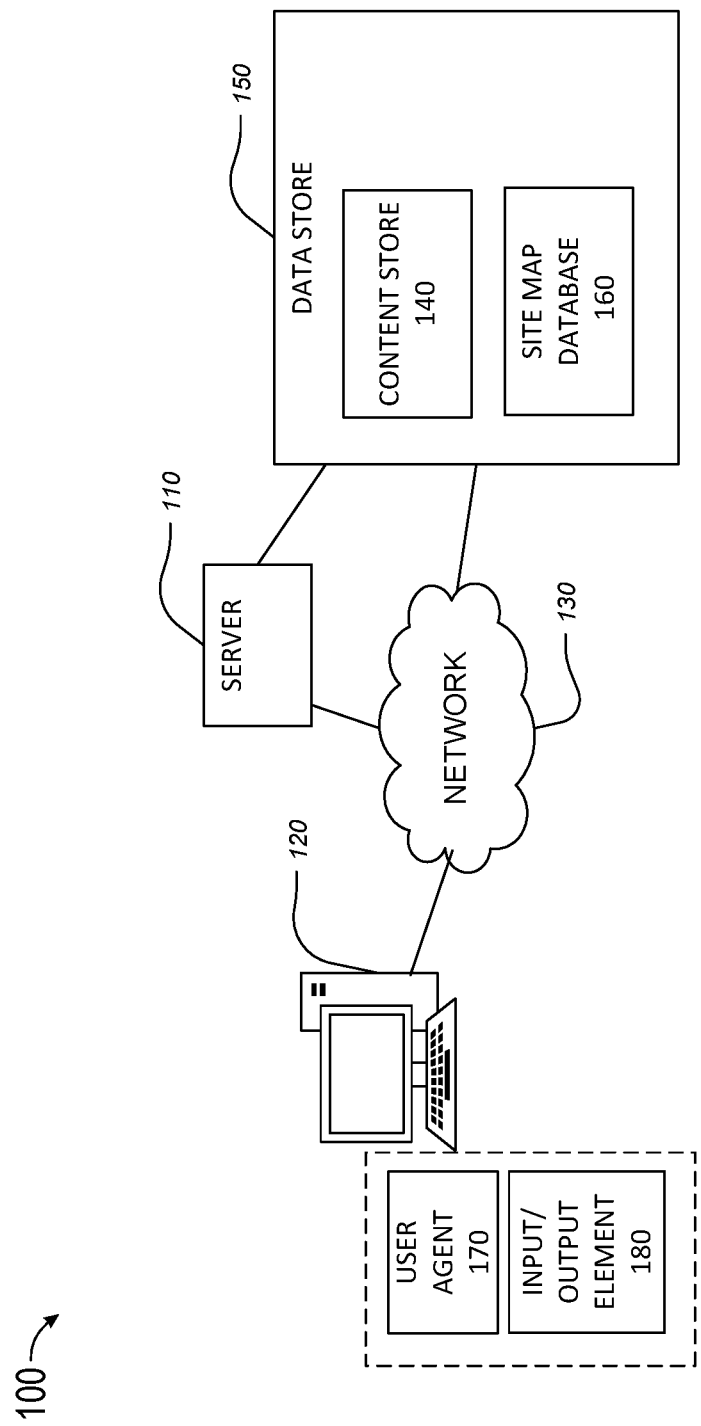
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Web developers are often looking for ways to improve the look or functionality of existing websites. Furthermore, as time goes by, there are often changes that need to be made to existing sites. To do this, another website is often created offline. Once the content of the new target site is completed, the site may go online (e.g., for viewing, audience testing, etc.) but at a different URI than the URI associated with the original source site. Once testing is complete, the sites may be switched. This is often performed by renaming the original site to a temporary URI, renaming the target URI to the original URI and then renaming the temporary URI to the target URI. This may cause significant downtime for the original source website, during which the source is completely unavailable and may display a location not found site error code (e.g., HTTP 404 response code). This may be inconvenient to numerous users that make use of the site. If the original source site is a root site, downtime is even more problematic since not only the source site itself, but also all subsites that use the source site as the root may have downtime. This may cause significant inefficiency and inconvenience to all users of the source site.

To address these technical problems and more, in an example, this description provides a technical solution for efficiently switching the content of a source site to a target site. To improve the current methods of switching site content, the technical solution may employ a multi-step process that significantly reduces the amount of downtime at the source site. This may involve renaming the source site in a content store before swapping the lookup records in a site map database, and finally renaming the target site in the content store. This procedure minimizes the amount of time the source site will be unavailable. Furthermore, the procedures used for performing these operations may provide for safe retries in the event of an error. As a result, the technical solution provides an improved user experience for users, promotes efficiency and saves time.

As will be understood by persons of skill in the art upon reading this disclosure, benefits and advantages provided by such technical solutions can include, but are not limited to, a solution to the technical problem of users not being able to gain access to multiple websites that utilize a site as a root site when the root site is being switched to new content. Technical solutions and implementations provided here optimize and improve the process of switching website contents. The benefits provided by these solutions include improving user experience, reducing downtime and providing solutions for more efficient access to websites.

FIG. 1 illustrates an example system 100, upon which aspects of this disclosure may be implemented. The system 100 may include a server 110 which may be connected to or include a data store 150 in which data relating to websites and documents may be stored. The server 110 may be a cloud-based server that provides an online service for creating websites to share documents with others (e.g., colleagues, customers, partners, etc.). In one implementation, the server 110 offers various features and capabilities such as authoring, creating lists and libraries, and providing searching capabilities for websites, among others. The server 110 may operate as a shared resource server accessible by various computer client devices such as client device 120.

The data store 150 may include various databases (e.g., cloud-based databases) that store various data relating to websites and documents that are accessed via those websites. In an example, the data store 150 includes the content store 140 and the site map database 160. The content store, in turn, may include a database containing the content of websites that are accessed via the server 110. This may include the actual content of the websites and/or any documents that are accessed via those websites. The site map database 160, on the other hand, may contain a lookup database which associates a URI with the content to which the URI points, thus providing the ability to access the content via the URI. In an implementation, this provides the ability to modify the content that may be accessed via a URI by pointing the URI to a different content (e.g., a different website). However, performing this change often leads to significant downtime which may be particularly problematic for root sites. The process disclosed herein can achieve such a change with substantially reduced downtime.

It should be noted that although only one data store 150 is shown, each of the content store 140 and site map database 160 may have their own separate data store. Moreover, each of the content store 140 and the site map database 160 may be connected to separate servers that work together to deliver the functions and services provided by each data store.

The network 130 may be a wired or wireless network(s) or a combination of wired and wireless networks that connect one or more elements of the system 100. The system 100 may also include the client device 120, which may be connected via the network 130 to the server 110 and the data store 150. The client device 120 may be any type of device that can receive input from a user and communicate with the network 130 to send and receive information. Such client devices may include personal or handheld computing devices having or being connected to both input and output elements. For example, client devices 120 may be one of: a mobile telephone; a smart phone; a tablet; a phablet; a smart watch; a wearable computer; a personal computer; a desktop computer; a laptop computer; a gaming device/computer; a television; a thick client; a thin client; a browser-based client; an application executing on a device; an embedded widget operating on a device and the like. This list is for example purposes only and should not be considered as limiting.

In one implementation, the client device 120 may be a client device for an administrator of a website (e.g., a tenant administrator) and may include a user agent 170 in communication with an input/output element 180. The user agent 170 may be a browser executing on the client device 120 that enables the client device 120 to access the server 110 to create or modify websites or initiate a switch as discussed further below. In an example, the user agent 170 may provide a user interface (UI) that provides a portal to the administrator to initiate changes to the websites he/she manages. The UI may be displayed on a display device of the client device 120 by utilizing for example the user agent 170 and the input/output element 180. The internal hardware structure of a client device is discussed in greater detail in regard to FIGS. 5 and 6.

FIGS. 2A-2B illustrate simplified example site map and content database for directing a URI to a website and identifying a website within the content store. The database 200 of FIG. 2A displays a table for associating URIs with website names. For example, URI1 may be associated with a site named URI1 (the same names are being used for simplicity). Likewise, URI2 may be associated with a site named URI2 and URI3 may be associated with a site named URI3. This can determine how to access the content of a desired website in the content store. Thus, when a request for accessing a URI is received, the site map database can point to the name of the site (e.g., website) in the content store that contains the desired content. For example, when a user enters URI1 on their browser, a request may be sent via the server 110 to the site map database for identifying where in the content store the website associated with URI1 is located. The site map database may then locate URI1 in its record and determine that the name of the website associated with the requested URI is URI1. This information may then be sent to the server which may in turn attempt to locate and/or retrieve the website content named URI1 in the content store.

The database 250 of FIG. 2B displays a table for associating the content of a website with a site name. Thus, the database 250 may provide pointers to designated content. For example, the database 250 may illustrate that content provided at site 1 is named URI1. Similarly, the database 250 may depict that content provided at site 2 is named URI2 and so on. The naming convention may provide a mechanism via which content of a website may be switched with minimal downtime.

Figure 3A:
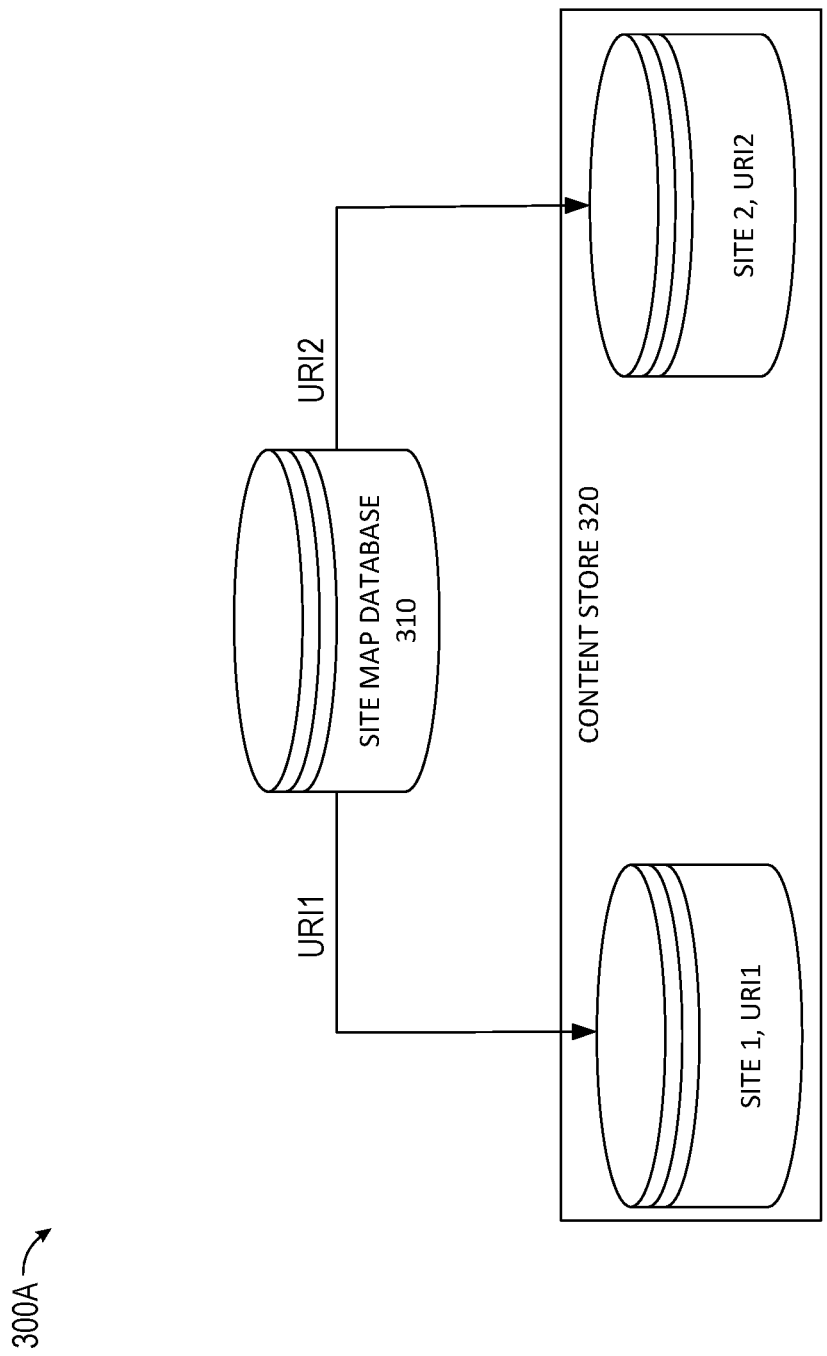
FIGS. 3A-3D depict simplified block diagrams for various steps in the process of efficiently swapping the content of a source site with a target site.
Figure 3B:
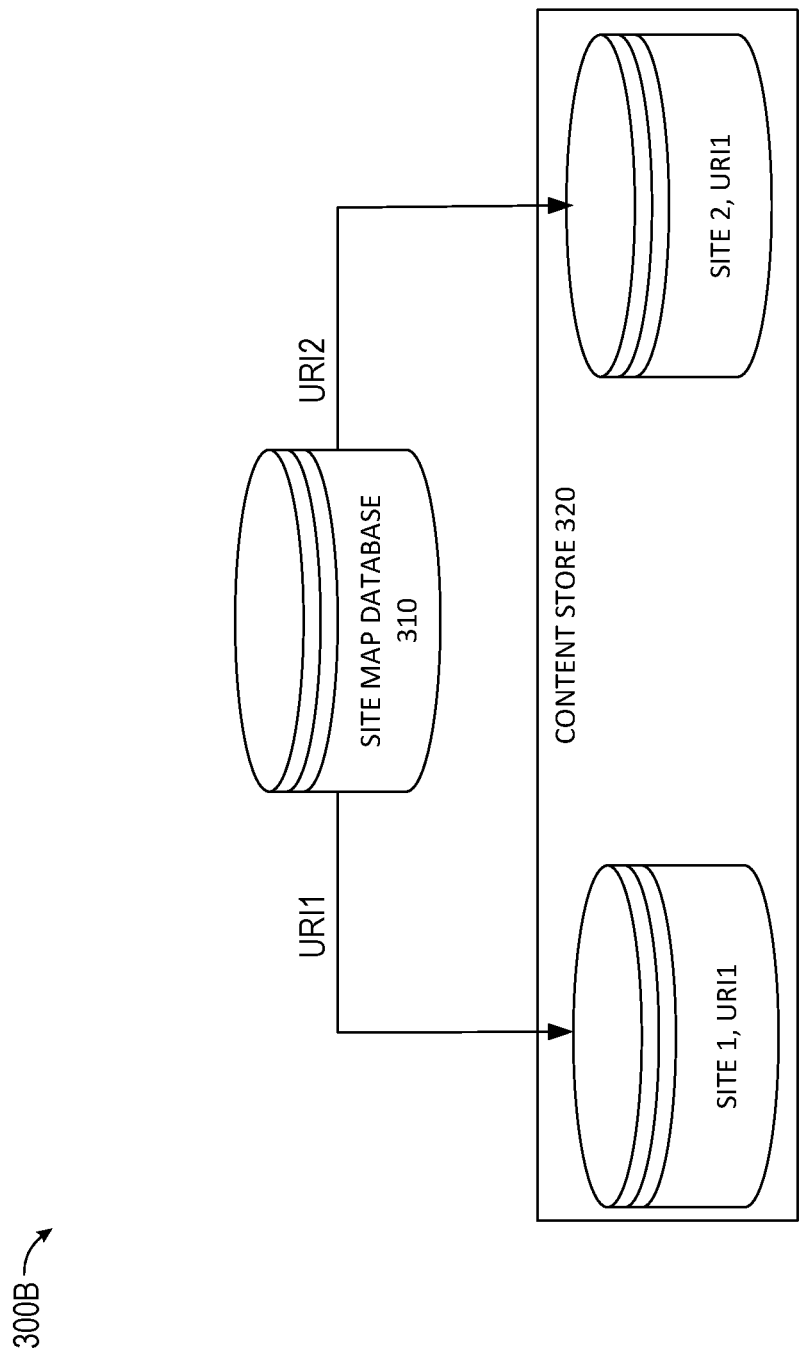
Figure 3C:
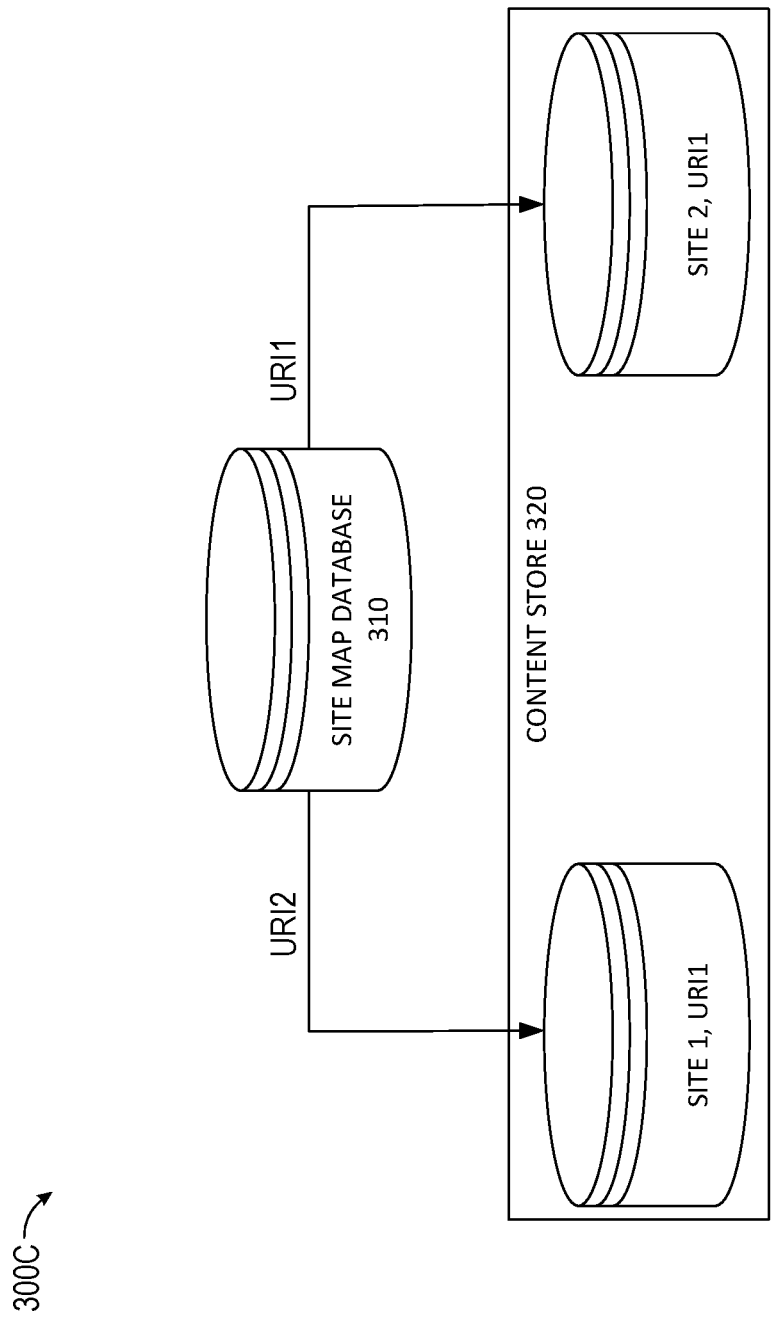
Figure 3D:
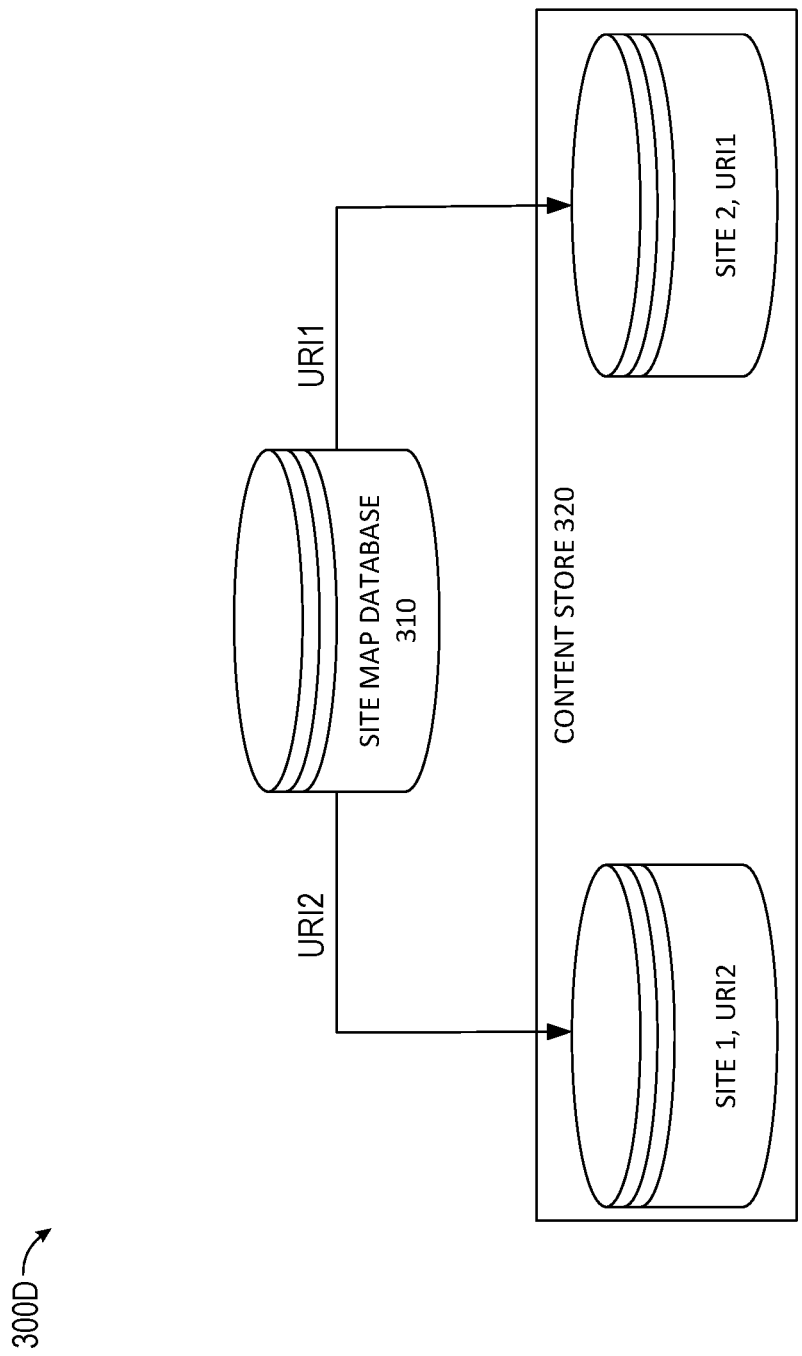

FIGS. 3A-3D depict simplified block diagrams for various steps in the process of efficiently swapping the contents of a source site with a target site. The block diagram 300A of FIG. 3A depicts how the site map database 310 may associate URI1 with the content of site 1 which is named URI1 in the content store 320. Similarly, the site map database 310 may associate URI2 with the content of site 2 which may be named URI2 in the content store 320. Site 1 in this example may be the source website (e.g., the original website), while site 2 is the target website (e.g., the new website). For example, site 1 may be a root site that provides a classic experience to users, while site 2 is a website designed to operate as the new root site which provides a modern experience to users. Thus, an enterprise (e.g., a tenant) utilizing site 1 as a root site for their websites may desire to switch their root site to the target site to provide a better experience for their users. Yet, the enterprise may still desire to keep the original source site active. For example, there may be content available on the original site that is useful to some users. Furthermore, there may be users who prefer to utilize the original site. As a result, in one implementation, the tenant initiates a site swap to exchange the location of the two sites with each other. It should be noted that this may require that the target site be available on the tenant website and locatable via a URI.

To achieve this, the target site (e.g., site 2) may first be renamed from URI2 to URI1 within the content store 320. This is depicted in the block diagram 300B of FIG. 3B, where URI2 is now pointing to site 2, but the name of site 2 has changed to URI1. This may result in the link to URI2 being temporarily unavailable. However, the link to URI1 still functions properly by pointing to the original source site (site 1) which is still named URI1.

Subsequently, the lookup records in the site map database may be switched such that URI1 now points to the target site (e.g., site 2) and URI2 points to the source site (e.g., site 1). This is depicted in the block diagram 300C of FIG. 3C. As shown, the URI records in the site map database 310 have been changed so URI2 which initially pointed to site 2 now points to site 1 (e.g., the source site) and URI1 (e.g., the root URI) now points to site 2 (e.g., the target site). Thus, the initial source URI1 may be switched to the new target site with minimum downtime. At this stage, URI1 functions properly by pointing to the content of the target site (e.g., site 2). However, the link to URI2 may still be unavailable since URI2 points to a content that is named URI1. This may result in an error page being displayed when URI2 is requested. While this may not be ideal since the original source is temporarily unavailable, it is less likely to cause significant inconvenience since the target site is meant to replace the source site. Furthermore, because the root site remains available throughout the process, all other subsites that are accessed via the root site continue being available. This is in contrast with prior methods of switching root sites which involve longer downtime for the root site and as a result more downtime for all other subsites.

Once URI1 has been successfully switched to point to the target site, the source site may be renamed within the content store from URI1 to URI2 to complete the swap. This is depicted in the block diagram 300D of FIG. 3D, where site 1 is renamed within the content store 320 from URI1 to URI2. As a result, URI2 points to the content of site 1 which is now named URI2, while URI1 continues pointing to the content of site 2 (e.g., the target site) at URI1. Once, this is complete, the link to URI2 becomes fully functioning by providing the content of the original source site (site 2). Thus, a root site can be switched from a source website to a target website quickly and efficiently with minimum or no downtime. In one implementation, swapping the site names in the site map database may be done with a single transaction (e.g., one SQL transaction) which is not committed until it succeeds. This may completely eliminate downtime.

Figure 4:
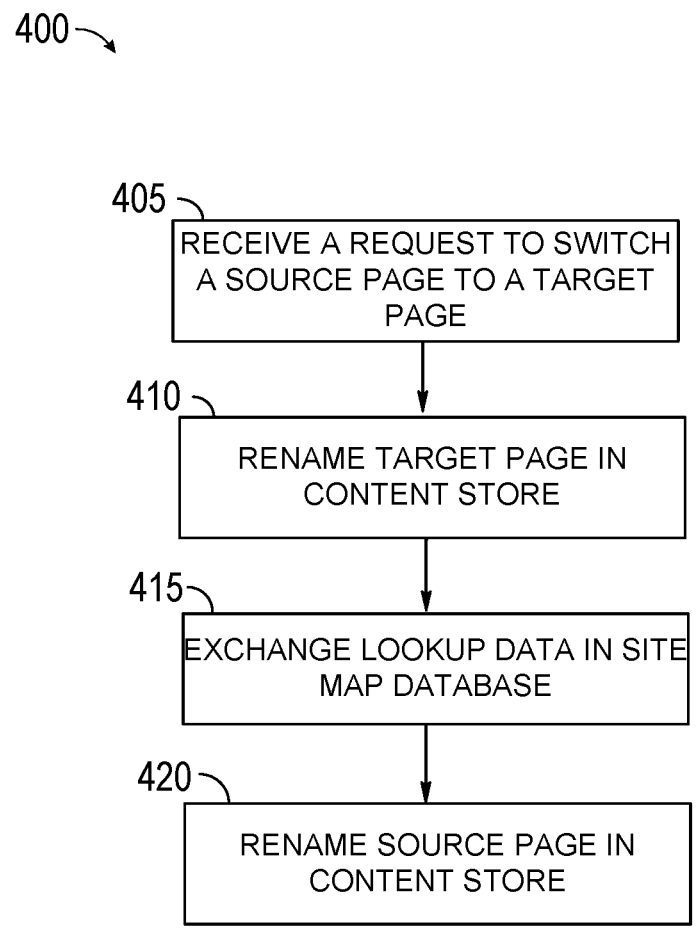
FIG. 4 is a flow diagram depicting an example method for switching the content of a source site with a target site.

FIG. 4 is a flow diagram depicting an example method 400 for switching the content of a source site with a target site. In one implementation, method 400 may be performed by a server such as server 110 of FIG. 1 which is connected to and operates with a content store and a site map database At 405, method 400 may begin by receiving a request to switch a source website with a target website. In an example, the source website is a root site (e.g., top level site) of a larger series of websites, all of which may utilize the root site as their entry point. The root site may be associated with the shortest URI in the series of websites. For example, the URI for the root site may be http://tenant-name.webservice.com, while all other sites for the tenant may have URIs that include http://tenant-name.webservice.com but are longer (e.g., http://tenant-name.webservice.com/sites/Archive or http://tenant-name.webservice.com/sites/SearchSite, etc.). Thus, the root site may function as the entry point to all other sites of the tenant. For example, application program interfaces (APIs) for all websites of the tenant may go through the root site. As a result, availability of the root site may be important to all other functionalities of the tenant websites.

The request to switch the content of the root site to a target website may be initiated by a tenant administrator via a user interface option presented to the tenant administrator. Once the request is initiated, it may be categorized as a work item assigned to a server as an asynchronous job. The server may then initiate a change where the target site is renamed in the content store, at 410. This may be performed by changing the name of the target site in the content store to the name of the site at the source URI. For example, if the sites use the URIs as their names, the name of the target site may be changed from URI2 to URI1. This does not affect the content to which URI1 points. As a result, URI1 may continue pointing to the original source site at this stage which ensures that the root site is available and functioning.

After renaming the target site in the content store, method 400 may proceed to exchange the lookup data in the site map database, at 415. This may be done by swapping the sites the two URIs point to. For example, the database may be revised such that URI1 points to the target site and URI2 points to the source site. Because the target site has already been renamed in the content store, exchanging the lookup data in the site map database results in the root site URI now pointing to and providing access to the target site. This means that the content accessed via the root site URI may be switched with minimal downtime since throughout the process the root site URI points to a functioning website (first the source site and now the target site). Exchanging the lookup data may also result in the second URI (URI2) now pointing to the content of the source site. In an alternative implementation, a different URI may be used in the lookup database to point to the source site. For example, the source site may be archived and thus may become accessible via an archive URI. In this case URI2 may cease to function or may be used to point to a different website.

Once the lookup data has been exchanged, method 400 may proceed to rename the source site in the content store, at 420. In one implementation, the source site is renamed to URI2 to ensure that the link to URI2 functions properly and points to the content of the original source site. In this manner the two sites are switched such that the root URI provides the content of the target site and the URI at which the target site was previously shown now provides access to the original source site. In an implementation in which the source site is not swapped with the target site but is instead archived, the source site may be renamed in the content store to the name of the archive URI. It should be noted that the term URI as discussed herein may include uniform resource locators (URLs) and uniform resource name (URNs).

Thus, in different implementations, a technical solution may be provided to enable reassociation of location mappings of two URI named objects without making use of a temporary URI. To achieve this, the technical solution makes use of naming conventions in the content store and the ability to switch URIs in the site map database to ensure that the root site points to a functioning website during the process, thus minimizing or eliminating downtime of the root site. The process may involve renaming the first site in the content store, changing the lookup data in the site map database from one site to the other while keeping the root site alive and then renaming the second site in the content store to bring the second URI back to life. This decreases downtime, increases efficiency and provides better customer service. The solution may also provide for safe retries in the event of an error. The process of implementing safe retries is discussed in U.S. Pat. No. 9,509,550, entitled "Generating an idempotent workflow," the entirety of which is incorporated herein by reference.

Figure 5:
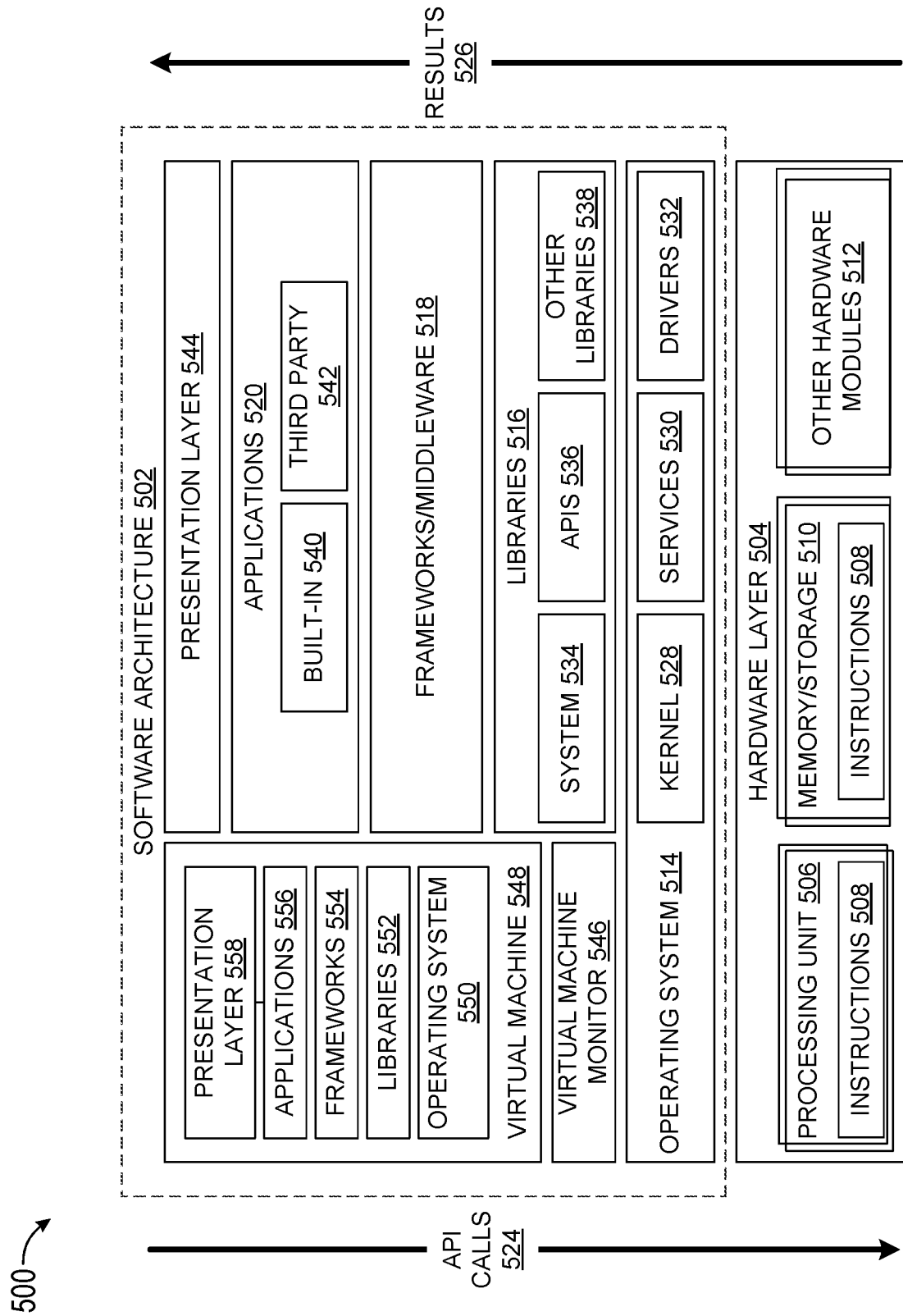
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
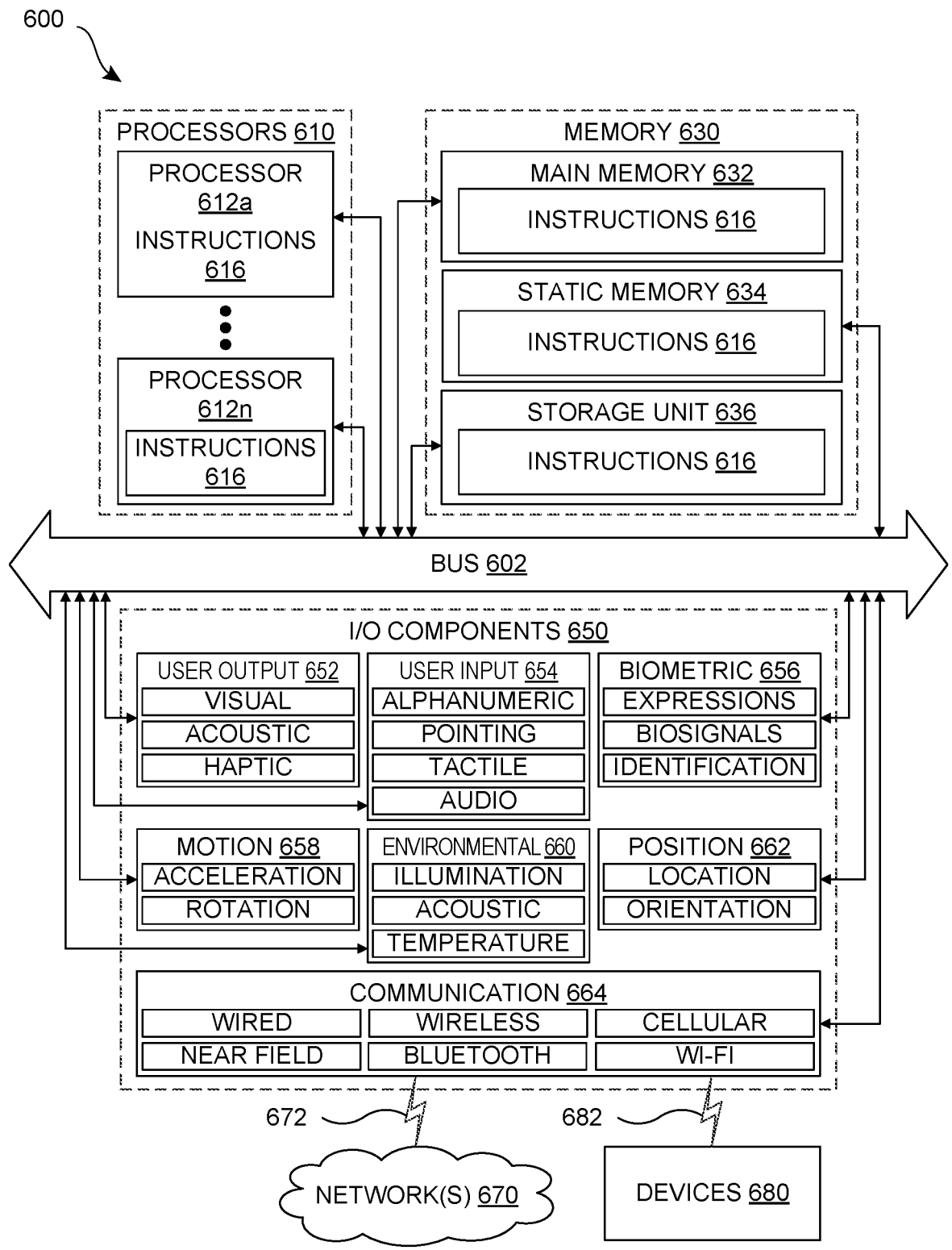
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory storing executable instructions that, when executed by the processor, cause the data processing system to perform functions of:
receiving a request over a network to switch a source site associated with a first URI with a target site associated with a second URI such that content of the target site can be accessed via the first URI, renaming the target site to associate the target site with the first URI, changing a lookup data associated with the first URI from the source site to the target site, and renaming the source site to associate the source site with a third URI.

Item 2. The data processing system of item 1, wherein the third URI is the same as the second URI.

Item 3. The data processing system of items 1 or 2, wherein the executable instructions when executed by the processor further cause the data processing system to perform functions of changing the lookup data associated with the second URI from the target site to the source site.

Item 4. The data processing system of any of the preceding items, wherein upon renaming the source site to associate the source site with the third URI, content of the target site can be accessed via the first URI and content of the source site can be accessed via the second URI.

Item 5. The data processing system of any of the preceding items, wherein each of the first URI and the second URI is a uniform resource locator (URL).

Item 6. The data processing system of any of the preceding items, wherein the third URI is a URI for an archive site.

Item 7. The data processing system of any of the preceding items, wherein the executable instructions when executed by the processor further cause the data processing system to perform functions of changing the lookup data associated with the second URI from the target site to a different site.

Item 8. A method for re-associating location mappings of two URI named objects, the method comprising:
receiving a request over a network to switch a source site associated with a first URI with a target site associated with a second URI such that content of the target site can be accessed via the first URI, renaming the target site to associate the target site with the first URI, changing a lookup data associated with the first URI from the source site to the target site, and renaming the source site to associate the source site with a third URI.

Item 9. The method of item 8, wherein the third URI is the same as the second URI.

Item 10. The method of items 8 or 9, further comprising changing the lookup data associated with the second URI from the target site to the source site.

Item 11. The method of any of items 8-10, wherein upon renaming the source site to associate the source site with the third URI, content of the target site can be accessed via the first URI and content of the source site can be accessed via the second URI.

Item 12. The method of any of items 8-11, wherein each of the first URI and the second URI is a uniform resource locator (URL).

Item 13. The method of any of items 8-12, wherein the third URI is a URI for an archive site.

Item 14. The method of any of items 8-13, changing the lookup data associated with the second URI from the target site to a different site.

Item 15. A non-transitory computer readable medium on which are stored instructions that when executed cause a programmable device to:
   receive a request over a network to switch a source site associated with a first URI with a target site associated with a second URI such that content of the target site can be accessed via the first URI,
   rename the target site to associate the target site with the first URI, change a lookup data associated with the first URI from the source site to the target site, and
   rename the source site to associate the source site with a third URI.

Item 16. The non-transitory computer readable medium of item 15, wherein the third URI is the same as the second URI.

Item 17. The non-transitory computer readable medium of items 15 or 16, wherein the instructions when executed further cause the programmable device to change the lookup data associated with the second URI from the target site to the source site.

Item 18. The non-transitory computer readable medium of any of items 15-17, wherein upon renaming the source site to associate the source site with the third URI, content of the target site can be accessed via the first URI and content of the source site can be accessed via the second URI.

Item 19. The non-transitory computer readable medium of any of items 15-18, wherein each of the first URI and the second URI is a uniform resource locator (URL).

Item 20. The non-transitory computer readable medium of any of items 15-19, wherein the third URI is a URI for an archive site.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory storing executable instructions that, when executed by the processor, cause the data processing system to perform functions of:
      receiving a request over a network to switch a source site associated with a first uniform resource identifier (URI) with a target site associated with a second URI such that content of the target site can be accessed via the first URI;
      changing a first name of the target site to associate the target site with the first URI;
      changing a lookup data associated with the first URI from the source site to the target site; and
      changing a second name of the source site to associate the source site with a third URI,
   wherein:
      the lookup data is a lookup record in a first database, the first database being a site map database, and the first name and the second name are changed in a second database, the second database being configured for associating contents of one or more sites to names.

2. The data processing system of claim 1, wherein the third URI is the same as the second URI.

3. The data processing system of claim 2, wherein the executable instructions when executed by the processor further cause the data processing system to perform functions of changing the lookup data associated with the second URI from the target site to the source site.

4. The data processing system of claim 3, wherein upon changing the second name of the source site to associate the source site with the third URI, content of the target site can be accessed via the first URI and content of the source site can be accessed via the second URI.

5. The data processing system of claim 1, wherein each of the first URI and the second URI is a uniform resource locator (URL).

6. The data processing system of claim 1, wherein the third URI is a URI for an archive site.

7. The data processing system of claim 6, wherein the executable instructions when executed by the processor further cause the data processing system to perform functions of changing the lookup data associated with the second URI from the target site to a different site.

8. A method for re-associating location mappings of two URI named objects, the method comprising:
receiving a request over a network to switch a source site associated with a first URI with a target site associated with a second URI such that content of the target site can be accessed via the first URI;
renaming the target site to associate the target site with the first URI;
changing a first name of the target site to associate the target site with the first URI;
changing a lookup data associated with the first URI from the source site to the target site; and
changing a second name of the source site to associate the source site with a third URI,
wherein:
the lookup data is a lookup record in a first database, the first database being a site map database, and
the first name and the second name are changed in a second database, the second database being configured for associating contents of one or more sites to names.

9. The method of claim 8, wherein the third URI is the same as the second URI.

10. The method of claim 9, further comprising changing the lookup data associated with the second URI from the target site to the source site.

11. The method of claim 10, wherein upon changing the second name of the source site to associate the source site with the third URI, content of the target site can be accessed via the first URI and content of the source site can be accessed via the second URI.

12. The method of claim 8, wherein each of the first URI and the second URI is a uniform resource locator (URL).

13. The method of claim 8, wherein the third URI is a URI for an archive site.

14. The method of claim 13, changing the lookup data associated with the second URI from the target site to a different site.

15. A non-transitory computer readable medium on which are stored instructions that when executed cause a programmable device to:
receive a request over a network to switch a source site associated with a first URI with a target site associated with a second URI such that content of the target site can be accessed via the first URI;
change a first name of the target site to associate the target site with the first URI;
change a lookup data associated with the first URI from the source site to the target site; and
change a second name of the source site to associate the source site with a third URI,
wherein:
the lookup data is a lookup record in a first database, the first database being a site map database, and
the first name and the second name are changed in a second database, the second database being configured for associating contents of one or more sites to names.

16. The non-transitory computer readable medium of claim 15, wherein the third URI is the same as the second URI.

17. The non-transitory computer readable medium of claim 16, wherein the instructions when executed further cause the programmable device to change the lookup data associated with the second URI from the target site to the source site.

18. The non-transitory computer readable medium of claim 17, wherein upon changing the second name of the source site to associate the source site with the third URI, content of the target site can be accessed via the first URI and content of the source site can be accessed via the second URI.

19. The non-transitory computer readable medium of claim 15, wherein each of the first URI and the second URI is a uniform resource locator (URL).

20. The non-transitory computer readable medium of claim 15, wherein the third URI is a URI for an archive site.

* * * * *